United States Patent
Holland, Jr.

[11] Patent Number: 5,161,849
[45] Date of Patent: Nov. 10, 1992

[54] PROTECTIVE COVER FOR AN AUTOMOTIVE VEHICLE

[76] Inventor: Matthew Holland, Jr., 48041 - I94 Service Dr., Apt. 204, Belleville, Mich. 48111

[21] Appl. No.: 787,117

[22] Filed: Nov. 4, 1991

[51] Int. Cl.$^5$ ............................................. B60J 11/00
[52] U.S. Cl. ................................ 296/95.1; 296/136; 160/370.2; 150/166; 116/28 R
[58] Field of Search ......................... 296/98, 95.1, 136; 150/166, 168; 160/370.2; 116/28 R, 33, 67 R; 340/426

[56] References Cited

U.S. PATENT DOCUMENTS

| | | | |
|---|---|---|---|
| 2,279,812 | 4/1942 | Bartlett | 150/166 |
| 2,950,749 | 8/1960 | MacDonald | 150/166 |
| 3,187,710 | 6/1965 | Wilfert | 116/67 R X |
| 3,952,688 | 4/1976 | Merriman | 116/67 R X |
| 4,222,032 | 9/1980 | Speer | 296/136 X |
| 4,253,084 | 2/1981 | Topputo | 340/426 |
| 4,274,077 | 6/1981 | Feiger | 296/136 |
| 4,355,839 | 10/1982 | Rosen | 296/136 |
| 4,799,728 | 1/1989 | Akers et al. | 296/95.1 X |
| 4,842,324 | 1/1989 | Carden | 296/95.1 X |
| 4,903,748 | 2/1990 | Foraker | 160/370.2 |

*Primary Examiner*—Dennis H. Pedder
*Attorney, Agent, or Firm*—Charles W. Chandler

[57] ABSTRACT

A flexible protective cover for an automotive vehicle is provided with an anchorage mechanism that is inserted through a door opening or trunk opening. When the door or trunk lid is closed and locked, the anchorage mechanism is trapped within the vehicle interior space so that it cannot be pulled out to remove the cover from the vehicle. The anchorage mechanism is preferably a hollow air-filled structure having a whistle or siren mounted in such a position that when an external pulling force is exerted on the anchorage mechanism air is forced out of the air-filled structure through the whistle or siren, thereby producing an audible alarm signal.

14 Claims, 1 Drawing Sheet

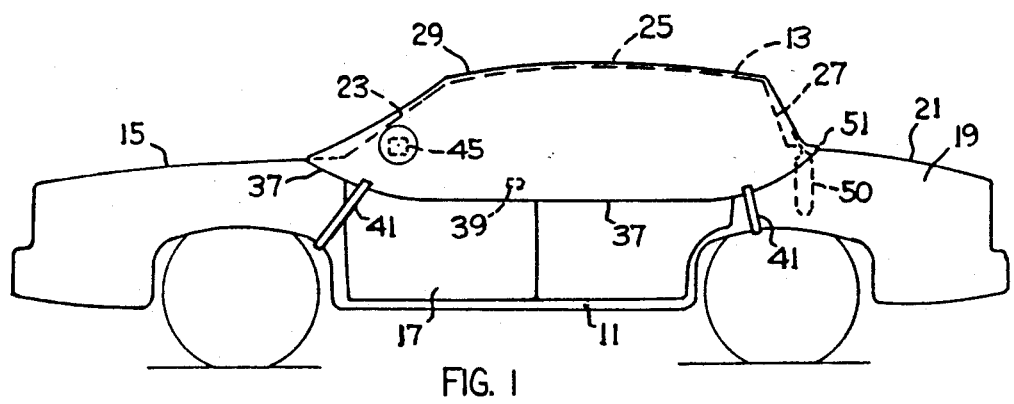
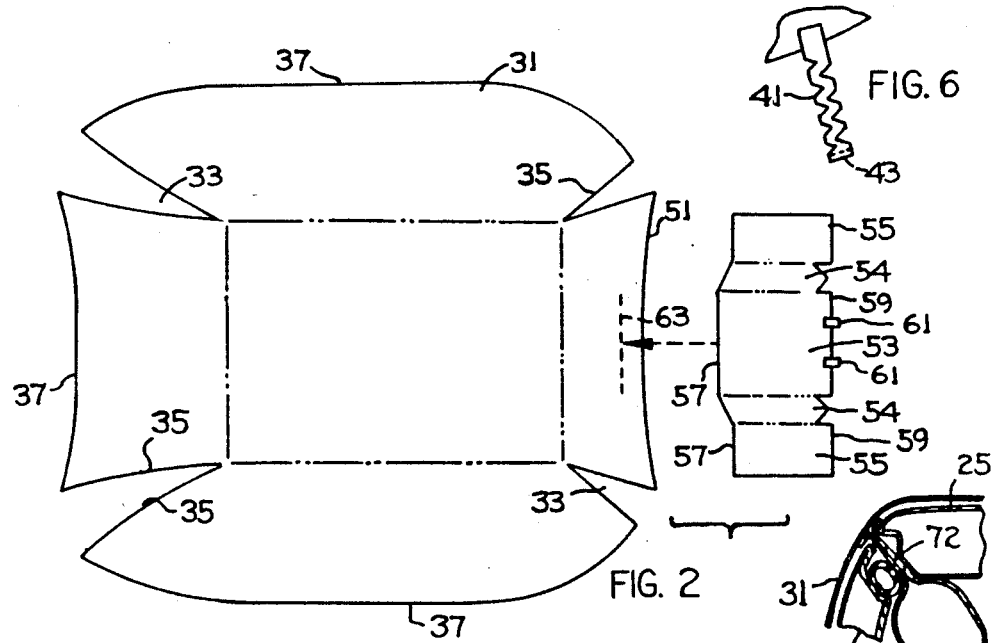
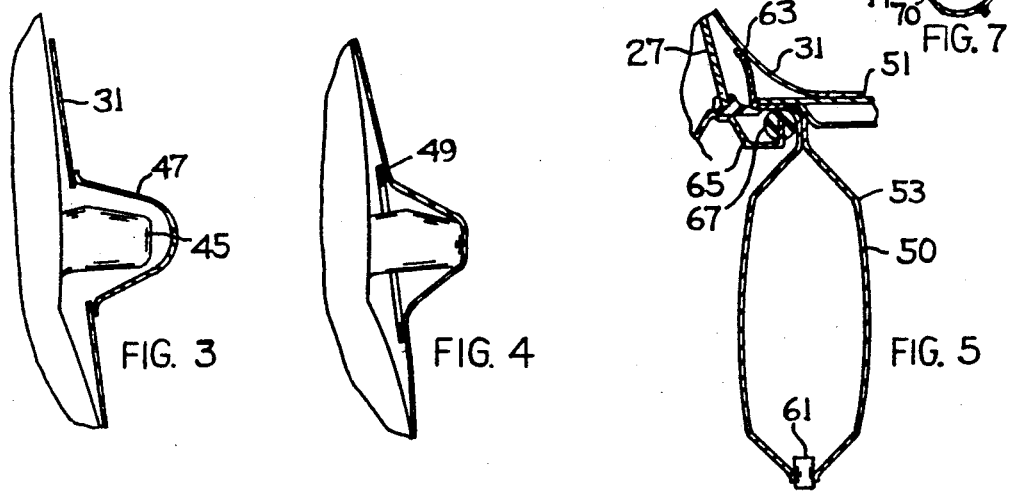

PROTECTIVE COVER FOR AN AUTOMOTIVE VEHICLE

BACKGROUND

1. Field the Invention

This invention relates to protective covers for automotive vehicles, e.g. passenger cars and pickup trucks. Such covers are commonly used to temporarily protect vehicles from the weather elements, e.g. the hot sun, snow, ice, etc.

2. Prior Developments

It is known that flexible fabric sheets can be placed over automotive vehicles to protect them from the weather elements. One such cover sheet is shown in U.S. Pat. No. 2,279,812 to F. Bartlett. Another somewhat similar cover is shown in U.S. Pat. No. 2,950,749 to G. W. MacDonald.

Such protective covers serve various purposes, e.g. to protect the vehicle interior space from the heating action of the sun, protecting glass areas from icing and freezing, protecting door locks and doors from freeze-up or sticking, shielding the outside rear view mirrors from ice, precluding the windshield wipers from freezing against the glass surfaces, and eliminating the need for windshield defrosting or snow removal.

One problem with many vehicle covers is that such covers can be readily and easily removed from the vehicle, thereby permitting such covers to be stolen. Some patents have been granted on devices for preventing the theft of covers while installed on the vehicles. U.S. Pat. No. 4,355,839 to J. S. Rosen shows a protective cover having a flexible strap that can be extended through a joint between an edge of a vehicle side door and the associated jamb surface at the door opening. An enlargement on the free end of the strap prevents the strap and attached cover from being withdrawn from the vehicle when the vehicle doors are locked. All of the vehicle access doors must be locked in order for this system to be effective. Also, the strap has to be formed of a high strength material that cannot easily be cut through by a scissors or knife.

U.S. Pat. No. 4,799,728 to Akers et al shows a somewhat similar arrangement wherein the anti-theft strap is connected at one end to the cover and at its other end to a bag. The bag is large enough to contain (or store) the protective cover when it is removed from the vehicle.

U.S. Pat. No. 4,842,324 to H. Carden shows a flexible protective cover that can be draped over the cab portion of a sedan (four door) vehicle. The rear edge of the flexible cover carries a tubular member that extends transverse to the vehicle longitudinal centerline when the cover is draped over the roof area of the vehicle. With the rear trunk lid opened, the transverse tubular member can be inserted downwardly into the trunk interior space. When the trunk lid is closed against a rear portion of the flexible cover, the tubular member is trapped within the trunk interior space so as to serve a theft-deterrent function. A thief would have to cut through the cover along a line paralleling the joint between the trunk lid and trunk opening in order to remove the cover from the vehicle.

One problem with the arrangement shown in Carden 4,842,324 is that the entire cover has to be formed of a high strength material resistant to being cut through with a knife or scissors. The reason for this requirement is that the anti-theft tubular element is attached directly to the cover, not to a separate strap extending from the cover.

Another problem with the device disclosed in Carden 4,842,324 is that the rear edge portion of the cover has to be of relatively reduced length in order to fit between the trunk lid hinges at the joint at the front edge of the lid. The rear portion of the cover can therefore not fully cover the upwardly facing surfaces of the car body adjacent the rear corners of the upwardly protruding cab portion of the vehicle.

A problem with all existing covers known to applicant is that the covers are not equipped with alarm devices to deter thieves from removing the covers from the associated vehicles. With conventional covers, a persistent skillful thief can remove the cover form the vehicle without fear of detection. High strength scissors are available that can cut through high strength fabric straps in a relatively short period of time.

SUMMARY OF THE INVENTION

The present invention relates to a protective cover for a vehicle, wherein the cover is equipped with an internal flexible anchorage means extendable into the joint between a trunk lid and a trunk opening. An air-operated, audible alarm means is carried on the free end of the anchorage means, i.e. on the end located within the trunk interior space when the lid is in its closed position.

Should a thief exert a pulling action on the cover in order to gain access to the internal anchorage means for purposes of serving the anchorage means from the cover, the audible alarm means will respond to the pulling force to generate an audible warning sound. The warning sound will persist for as long as the thief exerts the pulling action on the cover. As a result, the thief will be deterred from tampering with the cover construction for the time necessary to sever the cover from the anchorage means. In preferred practice of the invention, the audible alarm means is a whistle. Alternatively, the audible alarm means can be an air-operated siren.

IN THE DRAWINGS

FIG. 1 is a side elevational view of an automobile having a cover of the present invention installed thereon.

FIG. 2 is a plan view of a cover sheet that can be used in the practice of the invention, said sheet being shown prior to being sewn into its final hood-like configuration.

FIG. 3 is an enlarged fragmentary sectional view of a cover anchorage mechanism used with the FIG. 1 cover.

FIG. 4 is a fragmentary sectional view through a portion of the FIG. 1 cover designed to partially surround an outside rear view mirror on the vehicle.

FIG. 5 is a view taken in the same direction as FIG. 4, but showing an alternative cover construction adapted to overlie the vehicle rear view mirror.

FIG. 6 is a fragmentary view of a strap construction used to hold the FIG. 1 cover against the vehicle.

FIG. 7 is a fragmentary sectional view through an ancillary anti-theft device that can be used in the practice of the invention.

DESCRIPTION OF A PREFERRED EMBODIMENT OF THE INVENTION

FIG. 1 shows a conventional sedan-type vehicle having a lower main body portion 11, and an upwardly protruding cab portion 13. The main body portion has a front hood 15, side doors 17, and a rear trunk 19; the trunk is closed by a hinged trunk lid 21. Cab portion 13 has a front windshield 23, roof 25, and rear window 27.

The invention relates more particularly to a flexible cover 29 adapted for placement over the cab portion of the vehicle. The cover is preferably formed of a single weather-resistant sheet of material 31 formed into a hood-like configuration. As shown in FIG. 2, the blank sheet is slit at its four corners, as at 33, after which the slit edges 35 are sewn together to reconfigure the sheet into a hollow three-dimensional shape conforming generally to the surface contours of vehicle cab portion 13.

When the cover is installed on the vehicle, its peripheral side edge 37 extends along the side surfaces of the main body portion 11 a slight distance below the interface with the cab portion 13. Side surfaces of the cover extend below the door locks 39 (FIG. 1) to shield such locks from the weather elements, such as freeze-up.

The cover is held down against the vehicle body by means of four flexible straps 41, two of which are shown in FIG. 1. Each strap may be a length of elastomeric material having V-shaped notches along its side edges to provide a sinuous strap construction having enhanced resilience and stretchability. Each strap terminates in a hook 43, that may be an integral inturned end portion of the strap material designed to hook around an edge of a wheel well on the vehicle body.

FIGS. 3 and 4 show two different cover constructions designed to provide clearance around an outside rear view mirror 45 projecting from a side surface of the vehicle. FIGS. 3 and 4 are views looking in a front-to-rear direction along the side surface of the vehicle. In the FIG. 3 arrangement, the cover has a hole therethrough; a hollow fabric sock 47 is sewn to the cover sheet along the edge area of the hole in the sheet.

FIG. 4 shows an arrangement wherein an annular band 49 is sewn to the interior surface of sheet 31 while in an expanded condition. The band is shown in a contracted condition (with a smaller diameter), whereby the cover sheet is bulged outwardly to partially surround the rear view mirror while keeping the sheet close against the vehicle side surface.

The structures shown in FIGS. 3 and 4 are designed to provide an enclosure around the rear view mirror, while keeping sheet 31 relatively close against the vehicle surface, especially at the lower peripheral edge 37 of the sheet. The aim is to preclude wind forces from getting underneath the cover so as to unduly stress the cover or tear it away from the vehicle.

A major feature of the invention is an anchorage mechanism attached to an interior surface of cover sheet 31 for preventing unauthorized removal of the sheet from the vehicle, e.g. by a thief or vandal. The anchorage mechanism comprises an elongated flexible structure attached to sheet 31 adjacent its rear edge 51 for downward insertion into the trunk 19 space when lid 21 is in a raised open condition. After insertion of the anchorage mechanism into the trunk interior space, trunk lid 21 can be lowered to a closed position to exert a clamping force on the anchorage structure. The lid forces the flexible anchorage structure against the edge of the trunk opening, such that the anchorage structure is clamped in a relatively fixed position preventing removal of cover sheet 31 from its installed position on the vehicle.

An air-operated alarm means is attached to the lower end of the anchorage structure for disposition within the trunk interior space. The anchorage structure includes an air-containment chamber means located within the trunk interior space. Should a thief exert a pulling force on sheet 31 in order to gain access to the concealed anchorage structure for severing purposes, the air-containment chamber means will be squeezed by the pulling action so that air is expelled from the chamber means through the associated air-operated alarm means. Air flowing through the alarm means produces an audible alarm signal. In the preferred practice of the invention, the alarm means is a whistle or small siren (turbine).

The preferred anchorage mechanism is a flexible open-mouth fabric bag 50 attached to the undersurface of cover sheet 31 adjacent its rear edge 51. FIG. 2 shows the fabric bag 50 in the flat blank stage prior to being sewn together into the bag configuration. The bag includes a first flat major side wall 53, two minor side walls 54, and two half wall sections 55. When the blank sheet is folded into a tubular condition, and the confronting edges of the various side walls are sewn together, there is formed a three dimensional bag. Edges 57 of the bag constitute the upper open mouth portion of the bag; end edges 59 of the bag are sewn together to form the closed bottom of the bag. Two conventional tubular whistles 61 are adhesively or otherwise attached to bag wall 53 so as to be in pneumatic communication with the bag interior space.

The bag is attached to the undersurface of cover sheet 31 by gluing and stitching the upper edge area of bag wall 53 to the sheet along a glue-stick line 63 extending parallel to rear edge 51 of the sheet. The glue-stick line is spaced slightly away from edge 51 (two or three inches), so that when the cover sheet is installed on the vehicle, the rear edge portion of sheet 31 extends along the upper surface of trunk lid 21; the bag structure extends downwardly into the trunk interior space, as shown in FIG. 5.

Referring to FIG. 5, there is shown a generally conventional vehicle construction that fragmentarily includes rear window 27, a vehicle drip trough structure 65, an elastomeric seal element 67 bordering the trunk opening, and the upper edge of trunk lid 21. When the lid is swung upwardly to its open position a clearance space is created for downward insertion of bag 50 into the trunk interior space. As the lid is later swung down to its closed position, the front edge area of the lid deflects the major bag walls into a pinched condition engaged against sealing element 67. The bag is thus sealed shut, trapping air within the bag. The bag acts as an anchorage device for cover sheet 31.

Should a thief attempt to gain access to the bag for purpose of severing it from sheet 31 he/she will necessarily have to lift up the rear edge area of the sheet. The bag structure is disturbed by the action of raising sheet 31, such that the bag tends to be drawn upwardly through the crack between sealing element 67 and the edge of lid 21. The upper wall portions of the bag are squeezed together, such that air is expelled downwardly out of the bag through whistles 61. Air flow through the whistles produces an audible alarm signal that frightens the would-be thief away from the vehicle.

Bag structure 50 can be designed to have a relatively large volumetric capacity, which is desirable for generating a prolonged alarm signal. During the entire time that the would-be thief is attempting to pull cover sheet 31 away from the vehicle, the audible alarm signal continues. The bag structure can be provided at its lower end with an enlargement that prevents complete removal of the bag structure from the trunk interior space. Whistles 61 constitute enlargements for this purpose; additional enlargements can be incorporated into the bag bottom end if so desired.

The illustrated anti-theft construction depicted in FIG. 5 is used in the trunk interior space. Similar anti-theft structures could be employed within the vehicle passenger space. Such anti-theft structures would be inserted through the openings closed by side doors 17, after which the doors would be closed and locked to retain the anti-theft anchorage devices within the passenger space.

Within the broader aspects of the invention, the anti-theft bag structure 50 and associated alarms 61 can be used at any joint between a vehicle access opening and associated closure (door 17 or lid 21). However, the arrangement depicted in FIG. 5 is preferred because the trunk lid can be readily opened and closed after the cover sheet 31 is installed on the vehicle; only the rear edge portion of sheet 31 extends across any part of the trunk lid. If the anti-theft device were employed in the passenger space (through side doors 17) the door would have to be closed after the cover is in its installed position. This is somewhat inconvenient in that the cover sheet extends around or over the upper portion of the door so that the door has to be moved forcibly against the interior surface of the cover sheet.

When the invention is employed on a pickup truck or other vehicle not equipped with a trunk, the anti-theft mechanism will necessarily be utilized in the passenger space.

From the standpoint of optimal anti-theft protection for the cover in a passenger car environment, the use of multiple anchorage mechanisms would be the most preferred system. For example, one anchorage mechanism would be disposed within the trunk as shown in FIG. 5, and a second anchorage mechanism could be disposed within the passenger space along an inside edge of an access door 17. FIG. 7 fragmentarily shows a second anchorage mechanism attached to the underside of cover sheet 31 for disposition along an upper inside edge or vertical edge of a door 17. The anchorage mechanism comprises a hollow sealed pillow or balloon structure 70 formed of a reasonably strong non-porous fabric. The pillow structure is air-filled.

Pillow structure 70 has an elongated flexible neck structure 72 attached to the undersurface of cover sheet 31. When the balloon structure is inserted into the passenger space and the door 17 is closed (and locked) the pillow structure provides added anti-theft protection (supplementing the protection offered by bag 50 and alarm mechanisms 61). The air-filled pillow structure can be relatively small, e.g. only about five inches in diameter, while still providing the desired protection. An external pulling action on neck structure 72 pressurizes the pillow structure and thereby increases the resistance to the pull-out force.

The principal feature of the invention is the bag structure 50 and associated alarm means 61. The use of a bag structure as an air-containment chamber means is advantageous in that a relatively large air-containment chamber can be formed. Also, the bag can be used as a storage device for sheet 31 when the sheet is detached from the vehicle. Sheet 31 can be folded into a relatively compact bundle and then stuffed into the bag.

If it is not desired to use bag 50 as a cover sheet storage device, the upper ends of the bag walls can be permanently sealed shut, in the FIG. 5 configuration to form a closed air-containment chamber means. A check valve would be provided in the chamber wall to admit air into the chamber.

The drawings necessarily show a specific embodiment of the invention. However, it will be appreciated that the invention can be practiced in various forms and configurations.

Therefore I claim:

1. A protective cover installable on an automotive vehicle of the type having a main lower body, an upwardly protruding cab portion on said body, and plural closures including a selected vehicle closure for access to the vehicle interior space; said cover comprising a sheet of flexible material adapted to overlie the cab portion of the vehicle, said flexible sheet having a peripheral edge and an undersurface; a flexible anchorage means attached to the undersurface of said flexible sheet at a point near its peripheral edge; said anchorage means being an elongated flexible structure having a transverse thickness that permits it to extend through a joint between the vehicle and the selected vehicle closure when said selected closure is in a closed position, whereby the selected closure exerts a clamping action on the flexible anchorage means; and an audible alarm means carried by said anchorage means remote from the peripheral edge of said flexible sheet, whereby the alarm means is located within the vehicle interior space when said anchorage means is clamped to the vehicle by the selected closure; said alarm means being actuatable in response to an external pulling actions exerted on the flexible anchorage means.

2. The protective cover of claim 1, wherein said alarm means comprises a whistle.

3. The protective cover of claim 2, wherein said flexible anchorage means comprises an air-containment chamber means that is subject to be squeezed when an external pulling force is exerted thereon, whereby air is forced out of the chamber through the whistle, thereby producing an audible alarm.

4. The protective cover of claim 3, wherein said air-containment chamber means comprises an open-mouthed flexible bag oriented so that the mouth of the bag is in near proximity to the peripheral edge of the flexible sheet, whereby when the selected closure is in its closed position, the mouth of the bag is sealed shut by a clamping action between said selected closure and the body is in said closed position.

5. The protective cover of claim 4, wherein said whistle is mounted on the bag at a location remote from the bag mouth.

6. The protective cover of claim 5, wherein said bag is adapted to receive the flexible sheet therein when the sheet is detached from the vehicle.

7. A protective cover installable on an automotive vehicle of the type having a lower main body, an upwardly protruding cab portion having a front windshield and a rear window, side doors, a rear trunk, and a trunk lid; said cover comprising a sheet of flexible material adapted for placement over the cab portion of the vehicle so as to overlie the front windshield, side areas of the cab portion and the rear window; said flexible sheet having an under surface and a rear edge adapted to overlie a front portion of the trunk lid when said lid is in a closed position; a flexible anchorage means attached to the undersurface of said flexible sheet at a point near its rear edge; said anchorage means being an elongated flexible anchorage structure extending generally downwardly from the flexible sheet through a joint between the trunk lid and the trunk lid opening when the trunk lid is in its closed position; said elongated flexible anchorage structure having a transverse width dimension extending parallel to the rear edge of the associated flexible sheet, and a transverse thickness dimension that permits the flexible structure to fit between the trunk lid and trunk lid opening without damage to the flexible structure; and an audible alarm means carried by said elongated flexible structure remote from the rear edge of the flexible sheet, whereby the alarm means is trapped within the trunk interior space when said trunk lid is closed against the elongated flexible structure; said alarm means being actuatable in response to an external pulling force exerted on the flexible structure.

8. The protective cover of claim 7, wherein said alarm means is an air pressure device.

9. The protective cover of claim 7, wherein said elongated flexible anchorage structure comprises an air-containment chamber means that is deformable when an external pulling force is exerted thereon, whereby an air pressure force is developed within the chamber means; said alarm means being an air-operated device located on said air-containment chamber means so that pressurized air within the chamber means flows through said alarm means to produce an audible alarm.

10. The protective cover of claim 9, wherein said alarm means comprises a whistle.

11. The protective cover of claim 9, wherein said air-containment chamber means comprise an open-mouthed flexible bag oriented so that the mouth of the bag is in near proximity to the rear edge of the flexible sheet, whereby when the trunk lid is in its closed position, the mouth of the bag is sealed shut by the clamping action of the lid against the bag.

12. The protective cover of claim 11, wherein said air-operated alarm means is mounted on said bag remote from the bag mouth.

13. The protective cover of claim 7, wherein said flexible anchorage structure comprises an open-mouthed flexible bag having two major side walls defining the transverse width dimension of the flexible anchorage structure, and two minor side walls defining the transverse thickness dimension of the flexible anchorage structure; said minor side walls being collapsible when the trunk lid is moved to its closed position whereby the mouth of the bag is then sealed shut.

14. A protective cover installable on an automotive vehicle of the type having a main lower body, an upwardly protruding cab portion on said body, and plural closures including a selected closure for access to the vehicle interior space; said cover comprising a sheet of flexible material adapted to overlie the cab portion of the vehicle, said flexible sheet having a peripheral edge and an undersurface; balloon means attached to the undersurface of said flexible sheet at a point near its peripheral edge; said balloon means being an elongaged flexible structure having a transverse thickness that permits it to extend through a joint between the vehicle and said selected vehicle closure when said selected closure is in a closed position, whereby the selected closure exerts a clamping action on the balloon means, the balloon means being squeezed when an external pulling force is exerted thereon preventing passage thereof through said joint.

* * * * *